United States Patent
Komatsu et al.

(10) Patent No.: US 7,521,388 B2
(45) Date of Patent: Apr. 21, 2009

(54) WEAR RESISTANT MEMBER COMPRISED OF SILICON NITRIDE AND PROCESS FOR PRODUCING THE SAME

(75) Inventors: Michiyasu Komatsu, Yokohama (JP); Minoru Takao, Yokohama (JP)

(73) Assignees: Kabushiki Kaisha Toshiba, Tokyo (JP); Toshiba Materials Co., Ltd., Yokohama-shi (JP)

( * ) Notice: Subject to any disclaimer, the term of this patent is extended or adjusted under 35 U.S.C. 154(b) by 0 days.

(21) Appl. No.: 10/572,749

(22) PCT Filed: Sep. 27, 2004

(86) PCT No.: PCT/JP2004/014529

§ 371 (c)(1),
(2), (4) Date: Jan. 26, 2007

(87) PCT Pub. No.: WO2005/030674

PCT Pub. Date: Apr. 7, 2005

(65) Prior Publication Data

US 2007/0161493 A1 Jul. 12, 2007

(30) Foreign Application Priority Data

Sep. 25, 2003 (JP) ............................. 2003-334122

(51) Int. Cl.
*C04B 35/584* (2006.01)
(52) U.S. Cl. ..................................... 501/97.2; 501/97.3
(58) Field of Classification Search .................. 501/92, 501/97.2, 97.3, 97.4
See application file for complete search history.

(56) References Cited

U.S. PATENT DOCUMENTS

| | | | | |
|---|---|---|---|---|
| 5,366,941 A | * | 11/1994 | Takahashi et al. | 501/92 |
| 5,439,856 A | * | 8/1995 | Komatsu | 501/97.2 |
| 5,698,896 A | * | 12/1997 | Komatsu et al. | 257/705 |
| 6,242,374 B1 | * | 6/2001 | Komatsu | 501/97.2 |
| 6,642,165 B2 | * | 11/2003 | Miyashita et al. | 501/97.4 |
| 7,056,850 B2 | * | 6/2006 | Komatsu | 501/97.2 |
| 7,151,066 B2 | * | 12/2006 | Komatsu et al. | 501/92 |
| 2002/0098966 A1 | * | 7/2002 | Miyashita et al. | 501/97.1 |

FOREIGN PATENT DOCUMENTS

| | | | |
|---|---|---|---|
| JP | 04260669 | * | 9/1992 |
| JP | 6-135771 | | 5/1994 |
| JP | 7-118070 | | 5/1995 |
| JP | 9-20563 | | 1/1997 |
| JP | 9-142935 | | 6/1997 |
| JP | 2002-68846 | | 3/2002 |
| JP | 2003-34581 | | 2/2003 |
| JP | 2003034581 | * | 2/2003 |

* cited by examiner

*Primary Examiner*—Karl E Group
(74) *Attorney, Agent, or Firm*—Oblon, Spivak, McClelland, Maier & Neustadt, P.C.

(57) ABSTRACT

A silicon nitride abrasion resistant member is formed of silicon nitride sintered body containing 2% to 4% by mass of a rare earth element in terms of oxide thereof as a sintering aid, 2% to 6% by mass of an Al component in terms of oxide thereof, and 2% to 7% by mass of silicon carbide. The silicon nitride sintered body has a porosity of 1% or less, a three-point bending strength of 800 to 1000 MPa, and a fracture toughness of 5.7 to 6.5 MPa·m$^{1/2}$. According to this structure, even when an inexpensive silicon nitride powder manufactured by metal nitriding method is used, there can be provided a silicon nitride abrasion resistant member having a mechanical strength, high abrasion resistance, and a rolling life, equal to or higher than those of conventional silicon nitride sintered bodies, and excellent workability, and a method for manufacturing the member can be provided.

6 Claims, 1 Drawing Sheet

WEAR RESISTANT MEMBER COMPRISED OF SILICON NITRIDE AND PROCESS FOR PRODUCING THE SAME

TECHNICAL FIELD

The present invention relates to a silicon nitride-based abrasion (wear) resistant member and a method for manufacturing the member, and more particularly to a silicon nitride abrasion resistant member that, even when prepared from inexpensive powdered silicon nitride manufactured by metal nitriding, has a mechanical strength, high abrasion resistance, a rolling life, equal to or higher than those of conventional sintered silicon nitride, and excellent workability, and to a method for manufacturing the member.

BACKGROUND ART

Conventional sintered silicon nitride is known to have a composition, for example, of silicon nitride/rare-earth oxide/aluminum oxide, or silicon nitride/yttrium oxide/aluminum oxide/aluminum nitride/titanium. A sintering aid, including a rare-earth oxide such as yttrium oxide ($Y_2O_3$) in the composition described above, has widely been used to enhance sintering, thus increasing the density and the strength of a sintered body.

Conventional silicon nitride sintered body for use in a rolling bearing member, which requires high abrasion resistance (wear resistance), in particular excellent sliding characteristics, is commonly manufactured using as a raw powder a high-purity silicon nitride fine powder, for example, synthesized by thermal decomposition of an imide.

However, the conventional silicon nitride sintered body for use in a rolling bearing member is manufactured by using an expensive raw powder synthesized in accordance with a process of thermal decomposition of an imide. Furthermore, the conventional silicon nitride sintered body has so high a mechanical strength or a fracture toughness that the sintered body has poor workability. Thus, there has been posed a problem that a product formed of the abrasion resistant member involves higher manufacturing costs.

Although the silicon nitride sintered body manufactured by the conventional method has a higher bending strength, increased fracture toughness, and improved abrasion resistance, it is insufficient in rolling characteristics and durability particularly necessary to the bearing member. Thus, the silicon nitride sintered body needs further improvement.

In recent years, there has been an increase in demand for ceramic material as a member for a precision apparatus. In such an application, the advantages of ceramics of high hardness, light weight (lightness), and high abrasion resistance are utilized together with high corrosion resistance and low thermal expansion. In particular, the application of the ceramic material as an abrasion resistant member forming a slide portion, such as a bearing, grows rapidly owing to its high hardness and excellent abrasion resistance.

However, when a bearing rolling ball is made of a ceramic abrasion resistant member, the abrasion resistant member is insufficient in the rolling life. Repeated rolling of the rolling ball under high stress in contact with a casing may cause exfoliation or fracture (crack) within a short period of operation. The exfoliation or fracture develops vibration of an apparatus including the bearing or tends to cause trouble damaging the apparatus. In either case, there has been also posed a problem that the ceramic abrasion resistant member exhibits poor durability and low reliability as a component material for the apparatus.

Further, manufacture of an abrasion resistant member having a fine uniform sintered compact structure and excellent strength characteristics requires a high-purity ceramic raw material with less impurity content. This situation increases the raw material cost and thus greatly increases the manufacturing cost of the abrasion resistant member.

The present invention had been achieved to address the problems described above. Accordingly, it is an object of the present invention to provide a silicon nitride abrasion resistant member suitable for a rolling bearing member and a method for manufacturing the member. The silicon nitride abrasion resistant member, even when prepared from inexpensive powdered silicon nitride manufactured by metal nitriding, has a mechanical strength, abrasion resistance, and a rolling life, equal to or higher than those of conventional sintered silicon nitride, and has particularly excellent workability.

DISCLOSURE OF THE INVENTION

In order to achieve the aforementioned object, the inventors of the present invention experimentally changed the type of silicon nitride raw powder, the type and the amount of sintering aid or additive, and firing conditions, widely used in the manufacture of conventional silicon nitride sintered body, and thereby studied the effects of these factors on the characteristics of the resultant sintered bodies. As a result, the present inventors found that a silicon nitride abrasion resistant member can have a density, a mechanical strength, abrasion resistance, and a rolling life, equal to or higher than those of conventional silicon nitride sintered bodies, and particularly excellent workability and is suitable for a rolling bearing member when a raw material mixture prepared by adding predetermined amounts of rare-earth oxide, aluminum component such as aluminum oxide or aluminum nitride, silicon carbide, and optionally at least one element selected from the group consisting of Ti, Hf, Zr, W, Mo, Ta, Nb, and Cr to an inexpensive fine silicon nitride powder synthesized by metal nitriding is sintered, and when the sintered compact is subjected to HIP (hot isostatic pressing) treatment under predetermined conditions.

The present inventors also found that the control of particular impurity elements of iron (Fe) and calcium (Ca) within a particular range prevents or reduces the formation of cohesive portions (aggregated portions) in a sintered silicon nitride structure. This reduces fragile portions serving as the origin (starting portion) of fracture and provides an abrasion resistant member having excellent life characteristics. The present invention had been accomplished on the basis of these findings.

Namely, a silicon nitride abrasion resistant member according to the present invention is formed of silicon nitride sintered body containing 2% to 4% by mass (oxide equivalent) of a rare earth element as a sintering aid, 2% to 6% by mass (oxide equivalent) of an Al component, and 2% to 7% by mass of silicon carbide and having a porosity of 1% or less, a three-point bending strength of 800 to 1000 MPa, and a fracture toughness of 5.7 to 6.5 MPa·m$^{1/2}$.

In the above silicon nitride abrasion resistant member, the sintered silicon nitride preferably contains 3% by mass or less (oxide equivalent) of at least one element selected from the group consisting of Ti, Zr, Hf, W, Mo, Ta, Nb, and Cr.

Further, in the above silicon nitride abrasion resistant member, the sintered silicon nitride preferably contains 10 to 3000 ppm of Fe. Preferably, the sintered silicon nitride contains 10 to 1000 ppm of Ca.

An excessive amount of Fe or Ca in the sintered silicon nitride over the prescribed range results in more easier formation of a fragile cohesive portion serving as the origin (starting portion) of fracture in the sintered silicon nitride structure, more easily causing a deterioration of the life characteristics of the abrasion resistant member. Use of a high-purity raw powder to decrease the impurity content below the prescribed range results in an increase in raw material cost, leading to an economical disadvantage. When the impurity content is within the prescribed range, an inexpensive silicon nitride raw powder manufactured by direct nitriding of metal Si can appropriately be used. The use of such raw material of low cost is very advantageous to a reduction in manufacturing costs.

In the above silicon nitride abrasion resistant member, three SUJ2 rolling steel balls having a diameter of 9.35 mm are placed on a track having a diameter of 40 mm disposed on the top surface of a plate abrasion resistant member formed of the sintered silicon nitride. When these rolling steel balls are rotated at 1200 rpm under a load of 39.2 MPa, the rolling life, which is defined by the number of rotations that have been occurred by the time the silicon nitride abrasion resistant member is exfoliated, is preferably at least $1 \times 10^7$.

Further, in the above silicon nitride abrasion resistant member, when the silicon nitride sintered body has a crushing strength of 150 to 200 MPa and a fracture toughness of 5.7 to 6.5 MPa·m$^{1/2}$ and when three rolling balls each having a diameter of 9.35 mm manufactured from an abrasion resistant member formed of this silicon nitride sintered body are placed on a track having a diameter of 40 mm disposed on the top surface of an SUJ2 steel plate and are rotated at 1200 rpm under a maximum contact stress of 5.9 GPa, the rolling fatigue life, which is defined by the elapsed time until the sintered silicon nitride rolling balls are exfoliated, is preferably at least 400 hours.

A method for manufacturing a silicon nitride abrasion resistant member according to the present invention includes the steps of preparing a raw material mixture by adding 2% to 4% by mass (oxide equivalent) of a rare earth element, 2% to 4% by mass of $Al_2O_3$, and 2% to 7% by mass of silicon carbide to silicon nitride powder, molding the raw material mixture into a compact (molded body), and sintering the compact in a non-oxidizing atmosphere, wherein the silicon nitride powder is synthesized by metal nitriding method, contains 1.5% by mass or less of oxygen and at least 80% by mass of α-silicon nitride, and has an average particle diameter of 1 μm or less.

Furthermore, in the above method for manufacturing a silicon nitride abrasion resistant member, 3% by mass or less (oxide equivalent) of at least one element selected from the group consisting of Ti, Hf, Zr, W, Mo, Ta, Nb, and Cr is preferably added to the silicon nitride powder.

In the above method for manufacturing a silicon nitride abrasion resistant member, preferably, 2% to 4% by mass of $Al_2O_3$ and 1% to 3% by mass of AlN are added to the silicon nitride powder, and the total content of the aluminum components in the raw material mixture is 6% by mass or less (oxide equivalent).

Furthermore, in the above method for manufacturing a silicon nitride abrasion resistant member, the silicon nitride sintered body is preferably subjected to HIP (hot isostatic pressing) treatment at a pressure of 30 MPa or more in a non-oxidizing atmosphere after the sintering step.

According to the above manufacturing method, in the preparation of the silicon nitride sintered body forming the abrasion resistant member, a rare earth oxide, an aluminum component, silicon carbide, and an optional compound, such as Ti, Hf, or Zr, or the like are added to an inexpensive silicon nitride raw powder manufactured by metal nitriding method. Thus, the compound, together with rare-earth oxide, such as yttrium oxide, reacts with the silicon nitride raw powder to form a liquid phase, serving as a sintering promoter. The sintering promoter can increase the density of a sintered compact and prevent or reduce the grain growth in the crystal structure. Thus, the resulting silicon nitride abrasion resistant member has particularly excellent workability, as well as a high mechanical strength, high abrasion resistance, and a long rolling life of the silicon nitride sintered body.

The silicon nitride powder used in the present inventive method and serving as the main component of silicon nitride sintered body forming an abrasion resistant member is an inexpensive silicon nitride raw powder manufactured by metal nitriding method. In consideration of the sintering characteristics, the bending strength, and the fracture toughness, preferably, the silicon nitride powder contains at least 80% by mass, preferably 90% to 97% by mass of α-silicon nitride containing 1.5% by mass or less, preferably 0.9% to 1.2% by mass of oxygen and has an average particle diameter of 1.2 μm or less, preferably about 0.6 to about 1.0 μm.

A silicon nitride raw material powder is known to have an α phase type and a β phase type. A silicon nitride sintered body of a β-silicon nitride powder tends to have insufficient strength. An α-silicon nitride powder provides a high-strength sintered body having a high aspect ratio and containing highly entangled silicon nitride crystal grains.

The amount of the α-silicon nitride powder is limited to at least 80% by mass in the present inventive method because the bending strength, the fracture toughness, and the rolling life of the sintered compact are improved significantly and the excellent characteristics of silicon nitride are remarkable in this range. Furthermore, in consideration of sintering characteristics, the amount of the α-silicon nitride powder is limited to 97% by mass or less. Preferably, the amount of the α-silicon nitride powder is 90% to 95% by mass.

Consequently, in consideration of the sintering characteristics, the bending strength, the fracture toughness, and the rolling life, the silicon nitride raw material powder preferably contains 1.5% by mass or less, preferably 0.9% to 1.2% by mass of oxygen and at least 80% by mass of α-phase type silicon nitride, and preferably has an average particle diameter of 1.2 μm or less, preferably about 0.6 to about 1.0 μm.

In particular, use of a fine raw material powder having an average particle diameter of 0.8 μm or less can provide a densely sintered body having a porosity of 1% or less even using a smaller amount of sintering aid. The porosity of the sintered body can easily be determined according to Archimedes' principle.

The rare earth element to be added to the silicon nitride raw material powder as a sintering aid may be an oxide of Y, Ho, Er, Yb, La, Sc, Pr, Ce, Nd, Dy, Sm, or Gd, or may include each of these substances to be oxidized by sintering operation or a combination of at least two oxides. These sintering aids react with the silicon nitride raw material powder to form a liquid phase, thus functioning as a sintering promoter.

The amount of the sintering aid is 2% to 4% by mass (oxide equivalent) of the raw material powder. When the amount of the sintering aid is less than 2% by mass, the resultant sintered body has an insufficient density and strength. In particular, when the rare earth element has a high atomic weight as in a lanthanoid element, the sintered body has a relatively low strength. When the amount of the sintering aid is more than 4% by mass, an excessive amount of grain boundary phases are generated. This may increase the number of pores or decrease the strength. Thus, the amount of the sintering aid is limited within the range described above. In particular, the amount of the sintering aid is desirably 2.5% to 3.5% by mass because of the same reason.

The aluminum component is 2% to 6% by mass (oxide equivalent) of aluminum oxide ($Al_2O_3$) or aluminum nitride (AlN). Specifically, $Al_2O_3$ is added at 4% by mass or less to enhance the function of the rare earth element as a sintering promoter, allows an increase in the density at low sintering temperature, control the grain growth in the crystal structure, and increase the mechanical strength, such as the bending strength and the fracture toughness, of a $Si_3N_4$ sintered body. However, less than 2% by mass of $Al_2O_3$ has insufficient effects. More than 4% by mass of $Al_2O_3$ increases the oxygen content in the sintered body. The increased oxygen content causes a nonuniform distribution of components in a grain boundary phase and decreases the rolling life. Thus, the amount of $Al_2O_3$ is controlled to be 2% to 4% by mass, preferably 2% to 3.5%.

On the other hand, AlN is added desirably at 3% by mass or less so as to prevent or reduce the evaporation of a silicon nitride component during the sintering operation and enhance the function of the rare earth element as a sintering promoter. However, less than 1% by mass of AlN has insufficient effects. More than 3% by mass of AlN decreases the mechanical strength of the sintered compact and the rolling life of the abrasion resistant member. Thus, the amount of AlN is controlled to be 1% to 3% by mass.

In this regard, the addition of both 2% to 4% by mass of $Al_2O_3$ and 1% to 3% by mass of AlN to the silicon nitride powder can more effectively improve the mechanical characteristics of a sintered body. However, an excessive amount of $Al_2O_3$ and AlN decreases the rolling life of the abrasion resistant member. Thus, the total content of the aluminum components in the raw material mixture is preferably set to 6% by mass or less (oxide equivalent).

Further, silicon carbide (SiC) as an indispensable additive component is dispersed as individual particles in a crystal structure and remarkably improves the rolling life of sintered silicon nitride. Less than 3% by mass of silicon carbide has insufficient effects. More than 7% by mass of silicon carbide results in an insufficient density and decreases the bending strength of the sintered body. Thus, the amount of silicon carbide is limited to 2% to 7% by mass. Preferably, the amount of silicon carbide is 3% to 6% by mass. Silicon carbide can be divided into an $\alpha$ type and a $\beta$ type, both of which exhibit the same operational effects.

On the other hand, at least one compound selected from the group consisting of oxide, carbide, nitride, silicide, and boride of Ti, Hf, Zr, W. Mo, Ta, Nb, and Cr enhances the function of the rare-earth oxide as a sintering promoter, promotes the dispersion in the crystal structure, and improves the mechanical strength and the rolling life of sintered silicon nitride. In particular, Ti, Mo, and Hf compounds are preferred. Less than 0.3% by mass (oxide equivalent) of the compound has insufficient effects. More than 3% by mass of the compound decreases the strength and the rolling life of the sintered body. Thus, the amount of the compound is limited to 3% by mass or less. Desirably, the amount of the compound is limited to 0.5% to 2% by mass.

Furthermore, as the same manner as in SiC, the compounds of Ti, Hf, Zr, W, Mo, Ta, Nb, or Cr, enhance the dispersion thereof in the crystal structure, and improve the mechanical strength of the silicon nitride sintered body. As a result, a fine grain boundary phase containing a rare earth element or the like is formed in a silicon nitride crystal structure, so that a cohesive segregated portion formed in the grain boundary phase becomes smaller and has a maximum width of 5 µm or less and an average width of 2 µm or less. Thus, the resulting silicon nitride abrasion resistant member has a maximum pore size of 0.4 µm or less and a porosity of 1% or less, and exhibits excellent mechanical characteristics with a three-point bending strength of 800 to 1000 MPa at room temperature, a fracture toughness of 5.7 to 6.5 MPa·m$^{1/2}$, and a crushing strength of 150 to 200 MPa.

Further, the compound described above containing Ti, Zr, or Hf or the like also discolors a sintered silicon nitride ceramic to be dark and black and thereby functions as a shading agent (light shielding agent) imparting opacity to the sintered body.

Furthermore, the porosity of a sintered body, which has a large effect on the rolling life and the bending strength of an abrasion resistant member, is controlled to be 1% or less. When the porosity is more than 1%, pores serving as the origin (starting point) of fatigue fracture increase greatly. An increase in the number of pores disadvantageously decreases the rolling life of the abrasion resistant member and the strength of the sintered body. More preferably, the porosity is set to 0.5% or less.

The silicon nitride sintered body forming an abrasion resistant member according to the present invention is manufactured, for example, by the following process. A raw material powder mixture is prepared by adding predetermined amounts of required additives, such as a sintering aid, aluminum component such as $Al_2O_3$ or AlN, silicon carbide, and organic binder, and optional compound, such as Ti or the like, to a silicon nitride fine powder having the predetermined particle diameter and a low oxygen content. Then, the resulting raw material powder mixture is molded into a compact having a predetermined shape. The raw material powder mixture may be molded by general-purpose molding-die pressing method or CIP (cold isostatic pressing) method.

In the formation of a compact (molded body) by the molding-die pressing method or the CIP molding method, the raw material powder mixture must be molded at a pressure of 120 MPa or more to form a grain boundary phase in which pores are hardly formed particularly after sintering operation. When the molding pressure is less than 120 MPa, a cohesive portion composed of a rare earth element compound, which principally forms a grain boundary phase, is easily formed. In addition, the resulting sintered body has an insufficient density, and the sintered body includes a lot of cracks.

The cohesive portion (segregated portion) in the grain boundary phase tends to act as the origin or starting point of fatigue fracture, decreasing the life and durability of the abrasion resistant member. On the other hand, the molding pressure more than 200 MPa may decrease the durability of a molding die and is not always productive and productivity is disadvantageously decreased. Thus, the molding pressure is preferably set to a range from 120 to 200 MPa.

Subsequently, the molded body (molded compact) is heated at a temperature of 600° C. to 800° C. in a non-oxidizing atmosphere or at a temperature of 400° C. to 500° C. in the air for one to two hours to remove the organic binder sufficiently and degrease the molded body.

Then, the degreased compact is sintered at normal pressure or high pressure in a non-oxidizing atmosphere of an inert gas, such as a nitrogen gas, a hydrogen gas, or an argon gas, at a temperature of 1600° C. to 1800° C. for 0.5 to 10 hours. Examples of the pressure sintering method include ambient pressure sintering, hot pressing method, and HIP method.

The silicon nitride sintered body may be subjected to HIP treatment in a non-oxidizing atmosphere at a pressure of 30 MPa or more. This treatment decreases the influence of pores, which act as the starting point of fatigue fracture in the sintered body. Thus, the resulting abrasion resistant member can have a further improved abrasion resistance and rolling life characteristic.

The silicon nitride abrasion resistant member thus prepared in accordance with the above manufacturing method contains 4.5% by mass or less of oxygen and has a porosity of 1% or less and a maximum pore size of 0.4 μm or less. The silicon nitride abrasion resistant member has a three-point bending strength of 800 to 1000 MPa at normal temperature and exhibits excellent mechanical characteristics.

Further, there can be obtained a silicon nitride abrasion resistant member also having a crushing strength of 150 to 200 MPa and a fracture toughness of 5.7 to 6.5 MPa·m$^{1/2}$.

According to an abrasion resistant member of the present invention and a method for manufacturing the same, a raw material powder mixture, prepared by adding predetermined amounts of a rare earth element, aluminum component such as $Al_2O_3$ or AlN, silicon carbide, and compound of Ti, Hf, Zr or the like to an inexpensive silicon nitride raw powder, has greatly improved sintering characteristics. The resulting silicon nitride abrasion resistant member has a high density and a high mechanical strength, equal to or higher than those of conventional silicon nitride sintered bodies, as well as high abrasion resistance and in particular a long rolling life and excellent workability, and is suitable for a rolling bearing member.

Thus, a bearing prepared using the above abrasion resistant member as a rolling bearing member can retain excellent rolling characteristics for a long period of time. Thus, a rotary apparatus having high operational reliability and great durability can be provided at a low cost and price. The abrasion resistant member can be also applied to wide applications requiring abrasion resistance, including a cutting tool, a rolling jig, a valve check ball, engine parts, various jigs and tools, various rails, and various rollers.

BEST MODE FOR CARRYING OUT THE INVENTION

Figure 1:
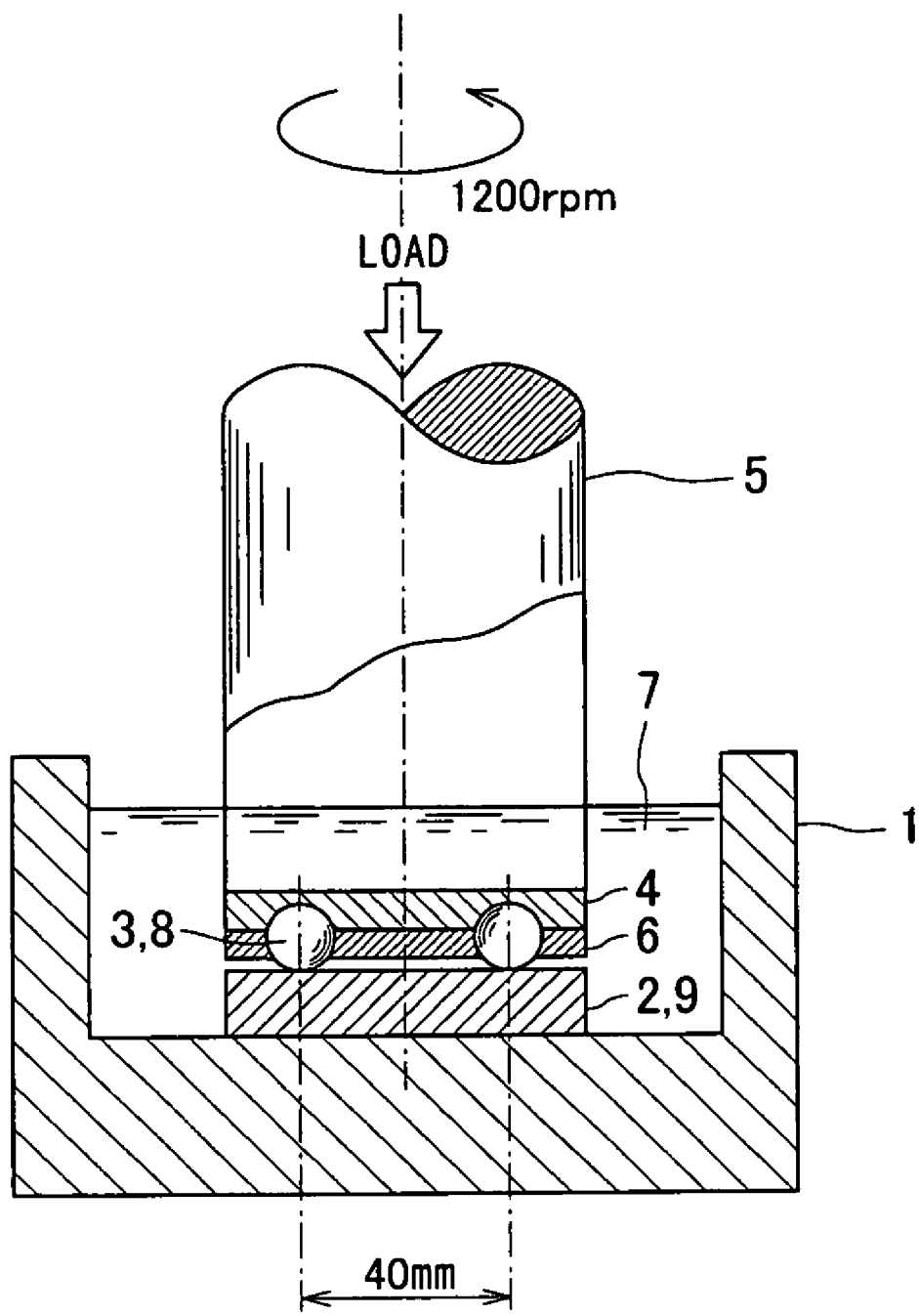
FIG. 1 is a cross-sectional view of a thrust rolling wear (abrasion) tester for measuring the rolling life characteristics of an abrasion resistant member according to the present invention.

Next, embodiments of the present invention will be specifically described with reference to the examples described below.

EXAMPLES 1 and 2

As Example 1, 3% by mass of $Y_2O_3$ (yttrium oxide) powder having an average particle diameter of 0.9 μm serving as a sintering aid, 3% by mass of powdered $Al_2O_3$ having an average particle diameter of 0.8 μm, 2% by mass of powdered AlN having an average particle diameter of 0.9 μm, 5% by mass of β-SiC (silicon carbide) having an average particle diameter of 0.8 μm, 1% by mass of powdered $TiO_2$ (titanium oxide) having an average particle diameter of 0.6 μm, and 1% by mass of powdered $Mo_2C$ (molybdenum carbide) having an average particle diameter of 1 μm were added to 83% by mass of $Si_3N_4$ (silicon nitride) raw powder that was manufactured by metal nitriding method. The $Si_3N_4$ (silicon nitride) raw powder contained 2800 ppm of Fe impurity, 700 ppm of Ca impurity, 1.3% by mass of oxygen, and comprising 85% of α-phase type silicon nitride, and had an average particle diameter of 0.6 μm. The raw material powder mixture was wet blended and ground in ethyl alcohol using silicon nitride balls as a grinding medium for 48 hours and was then dried to prepare a uniform raw material mixture.

Then, a predetermined amount of organic binder was added to the raw powder mixture to prepare a granulated preparation. The granulated preparation was pressed at a molding pressure of 150 MPa into a lot of compacts (molded bodies) of 50 mm×50 mm×5 mm in thickness for a bending strength test and a lot of compacts of 80 mm in diameter×6 mm in thickness for a rolling life test. Then, the compacts were degreased in an air current at 450° C. The degreased compacts were sintered in a nitrogen gas atmosphere at 0.7 MPa at a temperature of 1800° C. for 6 hours to prepare sintered silicon nitride abrasion resistant members according to Example 1.

The sintered bodies prepared in Example 1 were further subjected to HIP (hot isostatic pressing) treatment in a nitrogen gas atmosphere at a pressure of 100 MPa and a temperature of 1700° C. for one hour to prepare silicon nitride abrasion resistant members according to Example 2.

COMPARATIVE EXAMPLES 1 to 4

Silicon nitride abrasion resistant members according to Comparative Example 1 were prepared under the same conditions as in Example 1 except that powdered SiC was not added.

The sintered bodies prepared in Comparative Example 1 were subjected to HIP treatment in a nitrogen gas atmosphere at a pressure of 100 MPa and a temperature of 1700° C. for one hour, thereby to prepare silicon nitride abrasion resistant members according to Comparative Example 2.

Silicon nitride abrasion resistant members according to Comparative Example 3 were prepared under the same conditions as in Example 2 except that the powdered silicon nitride was manufactured by metal nitriding method, contained 1.7% by mass of oxygen and 70% of α-phase type silicon nitride, and had an average particle diameter of 1.5 μm.

Silicon nitride abrasion resistant members according to Comparative Example 4 were prepared under the same conditions as in Example 2 except that the silicon nitride raw material powder was synthesized by thermal decomposition of an imide.

Table 1 shows the porosity, the three-point bending strength at room temperature, the fracture toughness according to a microindentation method developed by Niihara, variations in the distribution of components in a grain boundary phase, and the rolling life for the silicon nitride abrasion resistant members thus prepared in the present Examples and Comparative Examples.

In this connection, the porosity of a sintered body was measured and determined according to Archimedes' principle. On the other hand, the variations in the distribution of components in a grain boundary phase were evaluated by selecting a unit area of 100 μm×100 μm from a cross section of the sintered body to be observed, observing an enlarged photograph (about 5000× magnification) taken by means of SEM or the like, and detecting the presence or absence of a cohesive segregated portion having a maximum width of 5 μm or more in the observed structure.

A cohesive segregated portion in an enlarged photograph taken by SEM (scanning type electron microscope) or the like, appears darker than an ordinary grain boundary phase (for example, in a black-and-white photograph, a silicon nitride crystal grain appears black, a grain boundary phase appears white, and a cohesive segregated portion appears dark white), so that the segregated portion and the ordinary grain boundary phase can be clearly and separately identified. In addition, when the presence of a rare earth element is examined by EPMA, if necessary, the concentration of the rare earth element is reflected in a color darker than that of an ordinary grain boundary phase and can also be clearly identified.

Bending test specimens (test pieces) of 3 mm×40 mm×4 mm in thickness prepared by cutting out from the respective sintered bodies were measured for the three-point bending strength at a span (distance between supporting points) of 30 mm and a load applying speed of 0.5 mm/min.

The rolling characteristics of the respective abrasion resistant members were measured by using a thrust rolling wear (abrasion) tester as illustrated in FIG. 1. The tester is constructed to include: a plate abrasion resistant member 2 disposed in a main body 1 of the tester; a plurality of rolling steel balls 3 disposed on the top surface of the abrasion resistant member 2; a guide plate 4 disposed on the rolling steel balls 3; a drive shaft 5 connected to the guide plate 4; and a holder (retainer) 6 for defining the interval between the respective rolling steel balls 3. The main body 1 is filled with a lubricating oil 7 for lubricating a rolling portion. The rolling steel balls 3 and the guide plate 4 are formed of high-carbon chromium bearing steel (SUJ2) in conformity with Japanese Industrial Standards (JIS G 4805). The lubricating oil 7 may be a paraffin type lubricating oil (viscosity at 40° C., 67.2 mm$^2$/S) or a turbine oil. 60 The rolling life of a plate-shaped abrasion resistant member according to the present Example, which was defined by the number of rotations that have been occurred by the time until the silicon nitride abrasion resistant member 2 was exfoliated, was determined by rotating three SUJ2 rolling steel balls 3 having a diameter of 9.35 mm placed on a track having a diameter of 40 mm disposed on the top surface of the abrasion resistant member 2 in a turbine oil bath at 1200 rpm under a load of 400 Kg up to $1\times10^7$ rotations. Table 1 shows the measured results.

On the other hand, in the abrasion resistant members according to Comparative Example 1, which contained no SiC component, there are increases in cohesive segregation of a liquid phase component and variations in the distribution of components in a grain boundary phase, and decreases in the strength characteristics and the rolling life.

On the other hand, in Comparative Example 2, where the sintered body was subjected to HIP but contained no SiC component, the three-point bending strength was high, but variations in the distribution of components in a grain boundary phase were not sufficiently reduced, and the rolling life was decreased.

In Comparative Example 3, where the silicon nitride raw powder was synthesized by metal nitriding method but contained a smaller amount of α-phase type silicon nitride (70%), variations in the distribution of components in a grain boundary phase were increased and therefore the rolling life was decreased.

Further, in Comparative Example 4, where silicon nitride raw material powder synthesized by thermal decomposition of an imide was used, the porosity, the bending strength, the fracture toughness, variations in the distribution of components in a grain boundary phase, and the rolling life were all excellent. However, there was a problem associated with workability. Furthermore, since this raw powder was expensive, the manufacturing costs were greatly increased.

The following Examples and Comparative Examples specifically describe the applications of an abrasion resistant member according to the present invention to a bearing rolling ball.

Examples 1B and 2B and Comparative Examples 1B to 4B

The granulated preparations (granulated grains) in Examples 1 and 2 and Comparative Examples 1 to 4 were charged into a molding die and were pressed into spherical compact precursors. The compact precursors were then sub-

TABLE 1

| Sample | Porosity (%) | Three-Point Bending Strength (MPa) | Fracture Toughness (MPa·m$^{1/2}$) | Variation in Component Distribution in Grain Boundary Phase | Rolling Life (rotations) |
|---|---|---|---|---|---|
| Example 1 | 0.5 | 880 | 6.2 | None | $>1\times10^7$ |
| Example 2 | <0.1 | 970 | 6.3 | None | $>1\times10^7$ |
| C. Example 1 | 0.3 | 800 | 6.1 | None | $3\times10^4$ |
| C. Example 2 | <0.1 | 900 | 6.2 | Exist | $2\times10^6$ |
| C. Example 3 | <0.1 | 930 | 6.1 | Exist | $1\times10^6$ |
| C. Example 4 | <0.1 | 1000 | 6.9 | None | $>1\times10^7$ |

C.Example Denoted Comparative Example.

As is evident from the measured results shown in Table 1, the silicon nitride abrasion resistant members according to the present Examples, which contained the predetermined additive components, had no or few pores and exhibited no variation in the distribution of components in a grain boundary phase. Although the silicon nitride abrasion resistant members according to the present Examples had lower strengths than some abrasion resistant members according to the present Comparative Examples, there could be obtained the abrasion resistant members according to the present Examples having excellent rolling lives and durability. In addition, the grain boundary phases in the abrasion resistant members according to the present Examples had the maximum pore sizes of 0.4 μm or less (not shown in Table 1).

jected to CIP treatment at 150 MPa to prepare spherical compacts having a diameter of 11 mm serving as test samples for the crushing strength and the rolling life.

The spherical compacts were degreased and were sintered under the same conditions as in the respective corresponding Examples and Comparative Examples, and, if necessary, were further subjected to HIP treatment to prepare densely sintered bodies. The sintered bodies were ground into bearing rolling balls as abrasion resistant members according to Examples 1B and 2B and Comparative Examples 1B to 4B. The bearing rolling balls had a diameter of 9.52 mm and a surface roughness of 0.01 μm Ra. The surface roughness was expressed as a center-line average roughness (Ra) along the equator of a rolling ball measured with a stylus profilometer.

The rolling balls thus prepared as the abrasion resistant members according to the present Examples and Comparative Examples were evaluated for the workability, the porosity, the crushing strength at room temperature, the fracture toughness according to a microindentation method developed by Niihara, variations in the distribution of components in a grain boundary phase, and the rolling fatigue life.

The workability was determined and measured as the reduction rate of the diameter per unit time when the sintered bodies were ground into the balls having the predetermined diameter (9.52 mm) and the surface roughness (0.01 μm Ra). The reduction rate was expressed relative to the reduction rate of a ball prepared as a high-hardness abrasion resistant member according to Comparative Example 4B using powdered silicon nitride synthesized by thermal decomposition of an imide (reference value 1).

The rolling fatigue life was measured by means of a thrust rolling abrasion (wear) tester illustrated in FIG. 1. In the Examples and the Comparative Examples described above, the test specimen was the abrasion resistant member 2, and the SUJ2 rolling steel balls 3 were rotated on the surface of the abrasion resistant member 2. In contrast, in Examples 1B and 2B and Comparative Examples 1B to 4B, where silicon nitride rolling balls 8 were evaluated, the abrasion resistant member 2 was replaced with an SUJ2 bearing steel plate 9.

Three rolling balls 8 having a diameter of 9.52 mm were manufactured from the abrasion resistant members as described above. The three rolling balls 8 were placed on a track having a diameter of 40 mm disposed on the top surface of the SUJ2 steel plate 9. The three rolling balls 8 were rotated in a turbine oil bath at 1200 rpm under a maximum contact stress of 5.9 GPa for 400 hours or less. The rolling fatigue lives of the sintered silicon nitride rolling balls 8 were determined by the elapsed time until the balls 8 were exfoliated. Table 2 shows the results of the measurements.

In Comparative Example 3B, where the silicon nitride raw powder was synthesized by metal nitriding method but contained a smaller amount of α-phase type silicon nitride (70%), it was confirmed that variations in the distribution of components in a grain boundary phase were increased and therefore the rolling life was decreased.

In Comparative Example 4B, where silicon nitride powder synthesized by thermal decomposition of an imide was used, the porosity, the bending strength, the fracture toughness, the variations in the distribution of components in a grain boundary phase, and the rolling life were all excellent. However, there was a problem associated with workability. Furthermore, since this raw powder was expensive, it was confirmed again that the manufacturing costs greatly increased.

In the measurement of the rolling fatigue lives of the silicon nitride rolling balls according to the present Examples, three rolling balls having a diameter of 9.52 mm were used. Even when the diameter and the number of balls to be arranged were changed, it was confirmed that the rolling characteristics depending on the loading conditions or rolling conditions could be obtained.

The following Examples and Comparative Examples specifically describes plate-shaped abrasion resistant members having different compositions or prepared under different treatment conditions from those in the Examples described above.

EXAMPLES 3 to 21

In Examples 3 to 21, the silicon nitride raw material powder used in Example 1, $Y_2O_3$ powder, $Al_2O_3$ powder having

TABLE 2

| Sample | Evaluation of Workability (Reduction Rate of Diameter per Time) | Porosity (%) | Crushing Strength (MPa) | Variation in Component Distribution in Grain Boundary Phase | Variation in Component Distribution in Grain Boundary Phase | Rolling Life (Hr) |
|---|---|---|---|---|---|---|
| Example 1B | 1.8 | 0.5 | 165 | 6.2 | None | >400 |
| Example 2B | 1.6 | <0.1 | 180 | 6.3 | None | >400 |
| C. Example 1B | 1.8 | 0.3 | 140 | 6.1 | Exist | 150 |
| C. Example 2B | 1.6 | <0.1 | 160 | 6.2 | Exist | 200 |
| C. Example 3B | 1.6 | <0.1 | 170 | 6.1 | Exist | 250 |
| C. Example 4B | 1 | <0.1 | 220 | 6.9 | None | >400 |

As is evident from the measurements shown in Table 2, the silicon nitride rolling balls according to the present Examples, which contained the predetermined additive components, exhibited excellent workability, no variation in the distribution of components in a grain boundary phase, crushing strengths comparable to the present Comparative Examples, and rolling fatigue lives of more than 400 hours. Therefore, the silicon nitride rolling balls according to the present Examples had great durability and were inexpensive.

In Comparative Example 1B, which contained no SiC, variations in the distribution of components in a grain boundary phase were large, and the crushing strength and the rolling fatigue life were decreased.

In Comparative Example 2B, which was subjected to HIP after sintering but contained no SiC, the pore size was reduced but the rolling fatigue life was decreased.

an average particle diameter of 1.0 μm, AlN powder having an average particle diameter of 0.5 μm, and SiC powder having an average particle diameter of 0.5 μm, and, as illustrated in Table 3, $Er_2O_3$ powder having an average particle diameter of 0.9 μm, $TiO_2$ powder having an average particle diameter of 0.5 μm, $Mo_2C$ powder having an average particle diameter of 1.0 μm, and various powdered compounds having an average particle diameter of 0.4 to 0.5 μm were mixed and compounded so as to provide the raw material mixtures having the compositions illustrated in Table 3.

The resulting raw material mixtures were molded and were degreased under the same conditions as in Example 1 thereby to prepare molded bodies. Then, the molded bodies consisting of the raw material mixtures were sintered under the conditions as illustrated in Table 3 and were subjected to HIP treatment, thereby to prepare plate-shaped silicon nitride abrasion resistant members according to Examples 3 to 21.

COMPARATIVE EXAMPLES 5 to 10

In Comparative Examples 5 to 10, as illustrated in Table 3, various additives, such as $Y_2O_3$ as a rare-earth oxide, $Al_2O_3$, AlN, and SiC were added in insufficient amounts or in excessive amounts so as to prepare raw material mixtures for the respective Comparative Examples.

The resulting raw material mixtures were molded to prepare molded bodies and the molded bodies were degreased under the same conditions as in Example 1. Then, the molded bodies consisting of the raw material mixtures were sintered under the conditions as illustrated in Table 3 and were subjected to HIP treatment, thereby to form silicon nitride abrasion resistant members according to Comparative Examples 5 to 10.

The silicon nitride abrasion resistant members thus manufactured in the present Examples and Comparative Examples were measured for the porosity, the three-point bending strength at room temperature, the fracture toughness, variations (scattering states) in the distribution of components in a grain boundary phase, and the rolling life of a disc plate under the same conditions in Example 1. Table 3 illustrates the results.

TABLE 3

| Sample | | Si₃N₄ | Rare Earth Oxide | Variation in Component Distribution in Grain Boundary Phase | | | | | Sintering Conditions Temp. × Time × Pressure (°C) × (hr) × (MPa) | HIP Conditions Temp. × Time × Pressure (°C) × (hr) × (MPa) | Porosity (%) | Three-Point Bending Strength (MPa) | Fracture Toughness (MPa·m^(1/2)) | Variation in Component Distribution in Grain Boundary | Rolling Life of Disc Plate (rotations) |
|---|---|---|---|---|---|---|---|---|---|---|---|---|---|---|---|
| | | | | | Al₂O₃ | AlN | SiC | Other Component | | | | | | | |
| Example | 3 | 90 | Y₂O₃ | 2 | 2 | 2 | 2 | TiO₂ 1 | 1800 × 6 × 0.7 | 1700 × 1 × 100 | <0.1 | 850 | 5.9 | None | >1 × 10⁷ |
| | 4 | 88 | Y₂O₃ | 3 | 2 | 2 | 3 | TiO₂ 1 Mo₂C 1 | 1775 × 6 × 0.7 | — | 0.4 | 840 | 6.3 | None | >1 × 10⁷ |
| | 5 | 86 | Y₂O₃ | 3 | 2 | 2 | 5 | TiO₂ 1 | 1800 × 6 × 0.7 | 1700 × 1 × 100 | <0.1 | 940 | 6.3 | None | >1 × 10⁷ |
| | 6 | 86 | Y₂O₃ | 3 | 2 | 2 | 5 | Mo₂C 1 | 1800 × 6 × 0.7 | — | 0.6 | 840 | 6.1 | None | >1 × 10⁷ |
| | 7 | 85 | Y₂O₃ | 4 | 2 | 2 | 5 | TiO₂ 1 | 1750 × 6 × 0.7 | 1700 × 1 × 100 | <0.1 | 930 | 6.2 | None | >1 × 10⁷ |
| | 8 | 85 | Y₂O₃ | 4 | 2 | 2 | 5 | Mo₂C 1 | 1750 × 6 × 0.7 | 1600 × 1 × 100 | <0.1 | 980 | 6.3 | None | >1 × 10⁷ |
| | 9 | 83 | Y₂O₃ | 4 | 2 | 2 | 7 | TiO₂ 1 | 1750 × 6 × 0.7 | 1700 × 1 × 100 | <0.1 | 950 | 6.0 | None | >1 × 10⁷ |
| | 10 | 86 | Y₂O₃ | 3 | 2 | 2 | 5 | Mo₂C 1 | 1800 × 6 × 0.7 | 1700 × 1 × 100 | <0.1 | 980 | 6.3 | None | >1 × 10⁷ |
| | 11 | 86 | Y₂O₃ | 4 | 4 | 1 | 3 | TiO₂ 1 | 1800 × 6 × 0.7 | 1700 × 1 × 50 | <0.1 | 980 | 6.3 | None | >1 × 10⁷ |
| | 12 | 85 | Y₂O₃ | 3 | 2 | 3 | 5 | Mo₂C 1 | 1800 × 6 × 0.7 | 1700 × 1 × 100 | <0.1 | 950 | 6.2 | None | >1 × 10⁷ |
| | 13 | 85 | Er₂O₃ | 4 | 3 | 2 | 5 | TiO₂ 1 | 1750 × 6 × 0.7 | 1700 × 1 × 100 | <0.1 | 960 | 6.3 | None | >1 × 10⁷ |
| | 14 | 84 | Y₂O₃ | 3 | 3 | 2 | 5 | TiO₂ 3 | 1800 × 6 × 0.7 | 1700 × 1 × 100 | <0.1 | 970 | 6.4 | None | >1 × 10⁷ |
| | 15 | 85 | Y₂O₃ | 3 | 3 | 2 | 5 | HfO₂ 2 | 1800 × 6 × 0.7 | 1700 × 1 × 100 | <0.1 | 970 | 6.4 | None | >1 × 10⁷ |
| | 16 | 85 | Y₂O₃ | 3 | 3 | 2 | 5 | ZrO₂ 2 | 1800 × 6 × 0.7 | 1700 × 1 × 100 | <0.1 | 960 | 6.3 | None | >1 × 10⁷ |
| | 17 | 86 | Y₂O₃ | 3 | 3 | 2 | 5 | NbC 1 | 1800 × 6 × 0.7 | 1700 × 1 × 100 | <0.1 | 970 | 6.3 | None | >1 × 10⁷ |
| | 18 | 86 | Y₂O₃ | 3 | 3 | 2 | 5 | WC 1 | 1800 × 6 × 0.7 | 1700 × 1 × 100 | <0.1 | 950 | 6.2 | None | >1 × 10⁷ |
| | 19 | 85 | Y₂O₃ | 3 | 3 | 2 | 5 | TaC 2 | 1800 × 6 × 0.7 | 1700 × 1 × 100 | <0.1 | 970 | 6.3 | None | >1 × 10⁷ |
| | 20 | 86 | Y₂O₃ | 3 | 3 | 2 | 5 | Cr₂O₃ 1 | 1800 × 6 × 0.7 | 1700 × 1 × 100 | <0.1 | 940 | 6.3 | None | >1 × 10⁷ |
| | 21 | 87 | Y₂O₃ | 3 | 3 | 2 | 5 | — | 1800 × 6 × 0.7 | 1700 × 1 × 100 | <0.1 | 900 | 6.3 | None | >1 × 10⁷ |
| Comparative Example | 5 | 83 | Y₂O₃ | 5 | 3 | 2 | 5 | TiO₂ 1 Mo₂C 1 | 1750 × 6 × 0.7 | 1700 × 1 × 50 | <0.1 | 1000 | 6.4 | Exist | 6 × 10⁶ |
| | 6 | 81 | Y₂O₃ | 7 | 3 | 2 | 5 | TiO₂ 1 Mo₂C 1 | 1750 × 6 × 0.7 | 1700 × 1 × 50 | <0.1 | 1050 | 6.6 | Exist | 5 × 10⁶ |
| | 7 | 80 | Y₂O₃ | 3 | 3 | 2 | 10 | TiO₂ 1 | 1800 × 6 × 0.7 | 1700 × 1 × 50 | <0.1 | 830 | 5.7 | None | 7 × 10⁶ |
| | 8 | 83 | Y₂O₃ | 3 | 5 | 2 | 5 | TiO₂ 1 Mo₂C 1 | 1800 × 6 × 0.7 | 1700 × 1 × 50 | <0.1 | 920 | 5.8 | Exist | 4 × 10⁶ |
| | 9 | 83 | Y₂O₃ | 3 | 3 | 4 | 5 | TiO₂ 1 | 1800 × 6 × 0.7 | 1700 × 1 × 50 | <0.1 | 940 | 5.8 | Exist | 5 × 10⁶ |
| | 10 | 83 | Y₂O₃ | 3 | 3 | 2 | 5 | TiO₂ 1 Mo₂C 5 | 1800 × 6 × 0.7 | 1700 × 1 × 100 | <0.1 | 960 | 6.2 | Exist | 6 × 10⁶ |

As is evident from the results shown in Table 3, the abrasion resistant members according to the present Examples, which were manufactured by sintering a raw material compact (molded body) containing a predetermined amount of a rare earth element and specified amounts of various additives and if necessary subjecting the sintered compact to HIP treatment, had no or few pores and exhibited no variation in the distribution of components in a grain boundary phase, the strength characteristics comparable to the present Comparative Examples, and the rolling lives of more than $10^7$. Thus, the silicon nitride abrasion resistant members according to the present Examples had great durability.

On the other hand, according to Comparative Examples 5 to 10, where the sintered bodies contained various additives, including a rare earth component, in amounts outside the specified range of the present invention, even when sufficient sintering or HIP treatment was performed, most sintered bodies exhibited variations in the distribution of components in a grain boundary phase and short rolling lives, failing to satisfy the characteristic requirements of the present invention.

The following Examples and Comparative Examples specifically describe the applications of the abrasion resistant members according to Examples 3 to 21 and Comparative Examples 5 to 10 applied to rolling balls of a bearing.

Examples 3B to 21B and Comparative Examples 5B to 10B

The granulated preparations (granulated particles) in Examples 3 and 21 and Comparative Examples 5 to 10 were charged into a molding die and were pressed into spherical compact precursors. The compact precursors were subjected to CIP treatment at a molding pressure of 150 MPa thereby to prepare spherical compacts having a diameter of 11 mm serving as test samples for measuring the crushing strength and the rolling life.

The spherical compacts were degreased under the same conditions as in Example 1, and were sintered and were subjected to HIP treatment under the conditions illustrated in Table 4. The resulting sintered bodies were ground into bearing rolling balls as abrasion resistant members according to Examples 3B and 21B and Comparative Examples 5B to 10B. The bearing rolling balls had a diameter of 9.52 mm and a surface roughness of 0.01 μm Ra. The surface roughness was expressed as a center-line average roughness (Ra) along the equator of a rolling ball measured with a stylus profilometer.

The rolling balls thus prepared as the abrasion resistant members according to the present Examples and Comparative Examples were evaluated for the workability, which was determined by the reduction rate of the diameter per unit time when the sintered bodies were ground into the balls, as well as the porosity, the crushing strength, the fracture toughness, variations in the distribution of components in a grain boundary phase, and the rolling fatigue life. The rolling fatigue life was measured as the same manner as in Example 1B. Table 4 shows the results of the measurements and evaluations.

TABLE 4

| Sample | | Material Composition (wt. %) | | | | | | | | Sintering Conditions Temp. × Time × Pressure (° C.) × (hr) × (MPa) | HIP Conditions Temp. × Time × Pressure (° C.) × (hr) × (MPa) | Workability (Reduction Rate of Diameter per Time) | Porosity (%) | Crushing Strength (MPa) | Fracture Toughness (MPa · m 1/2) | Variation in Component Distribution in Grain Boundary Phase | Rolling Life of Ball (Hr) |
|---|---|---|---|---|---|---|---|---|---|---|---|---|---|---|---|---|---|
| Example | | | | | | | | | | | | | | | | | |
| 3B | 90 | Y₂O₃ | 2 | 2 | 2 | 2 | TiO₂<br>Mo₂C | 2<br>2 | 1 | 1800 × 6 × 0.7 | 1700 × 1 × 100 | 2 | <0.1 | 155 | 5.9 | None | >400 |
| 4B | 88 | Y₂O₃ | 3 | 2 | 2 | 3 | TiO₂<br>Mo₂C | 2<br>3 | 1 | 1775 × 6 × 0.7 | None | 1.9 | 0.4 | 155 | 6.3 | None | >400 |
| 5B | 86 | Y₂O₃ | 3 | 2 | 2 | 5 | TiO₂<br>Mo₂C | 2<br>5 | 1 | 1800 × 6 × 0.7 | 1700 × 1 × 100 | 1.7 | <0.1 | 170 | 6.3 | None | >400 |
| 6B | 86 | Y₂O₃ | 3 | 2 | 2 | 5 | TiO₂ | 2 | 1 | 1800 × 6 × 0.7 | None | 1.9 | 0.6 | 155 | 6.1 | None | >400 |
| 7B | 85 | Y₂O₃ | 4 | 2 | 2 | 5 | TiO₂<br>Mo₂C | 2<br>5 | 1 | 1750 × 6 × 0.7 | 1700 × 1 × 100 | 1.7 | <0.1 | 170 | 6.2 | None | >400 |
| 8B | 85 | Y₂O₃ | 3 | 2 | 2 | 5 | TiO₂<br>Mo₂C | 2<br>5 | 1 | 1750 × 6 × 0.7 | 1600 × 1 × 100 | 1.6 | <0.1 | 190 | 6.3 | None | >400 |
| 9B | 83 | Y₂O₃ | 4 | 2 | 2 | 7 | TiO₂<br>Mo₂C | 2<br>5 | 1 | 1750 × 6 × 0.7 | 1700 × 1 × 100 | 1.7 | <0.1 | 175 | 6.0 | None | >400 |
| 10B | 86 | Y₂O₃ | 3 | 2 | 2 | 5 | TiO₂<br>Mo₂C | 2<br>5 | 1 | 1800 × 6 × 0.7 | 1700 × 1 × 100 | 1.6 | <0.1 | 185 | 6.3 | None | >400 |
| 11B | 86 | Y₂O₃ | 4 | 4 | 1 | 3 | TiO₂<br>Mo₂C | 2<br>5 | 1 | 1800 × 6 × 0.7 | 1700 × 1 × 50 | 1.7 | <0.1 | 180 | 6.3 | None | >400 |
| 12B | 85 | Y₂O₃ | 3 | 2 | 3 | 5 | TiO₂<br>Mo₂C | 2<br>5 | 1 | 1800 × 6 × 0.7 | 1700 × 1 × 100 | 1.7 | <0.1 | 175 | 6.2 | None | >400 |
| 13B | 85 | Er₂O₃ | 4 | 3 | 2 | 5 | TiO₂ | 2 | 1 | 1750 × 6 × 0.7 | 1700 × 1 × 100 | 1.7 | <0.1 | 175 | 6.3 | None | >400 |
| 14B | 84 | Y₂O₃ | 3 | 3 | 2 | 5 | TiO₂ | 2 | 3 | 1800 × 6 × 0.7 | 1700 × 1 × 100 | 1.6 | <0.1 | 180 | 6.4 | None | >400 |
| 15B | 85 | Y₂O₃ | 3 | 3 | 2 | 5 | HfO₂ | 2 | 2 | 1800 × 6 × 0.7 | 1700 × 1 × 100 | 1.6 | <0.1 | 175 | 6.4 | None | >400 |
| 16B | 85 | Y₂O₃ | 3 | 3 | 2 | 5 | ZrO₂ | 2 | 2 | 1800 × 6 × 0.7 | 1700 × 1 × 100 | 1.7 | <0.1 | 180 | 6.3 | None | >400 |
| 17B | 86 | Y₂O₃ | 3 | 3 | 2 | 5 | NbC | 2 | 1 | 1800 × 6 × 0.7 | 1700 × 1 × 100 | 1.6 | <0.1 | 170 | 6.3 | None | >400 |
| 18B | 86 | Y₂O₃ | 3 | 3 | 2 | 5 | WC | 2 | 1 | 1800 × 6 × 0.7 | 1700 × 1 × 100 | 1.7 | <0.1 | 190 | 6.2 | None | >400 |
| 19B | 85 | Y₂O₃ | 3 | 3 | 2 | 5 | TaC | 2 | 2 | 1800 × 6 × 0.7 | 1700 × 1 × 100 | 1.5 | <0.1 | 170 | 6.3 | None | >400 |
| 20B | 86 | Y₂O₃ | 3 | 3 | 2 | 5 | Cr₂O₃ | 2 | 1 | 1800 × 6 × 0.7 | 1700 × 1 × 100 | 1.6 | <0.1 | 170 | 6.3 | None | >400 |
| 21B | 87 | Y₂O₃ | 3 | 3 | 2 | 5 | — | | | 1800 × 6 × 0.7 | 1700 × 1 × 100 | 1.8 | <0.1 | 165 | 6.3 | None | >400 |
| Comparative Example | | | | | | | | | | | | | | | | | |
| 5B | 83 | Y₂O₃ | 5 | 5 | 2 | 5 | TiO₂<br>Mo₂C | 2<br>5 | 1 | 1750 × 6 × 0.7 | 1700 × 1 × 50 | 1.4 | <0.1 | 200 | 6.4 | Exist | 280 |
| 6B | 81 | Y₂O₃ | 7 | 3 | 2 | 5 | TiO₂<br>Mo₂C | 2<br>5 | 1 | 1750 × 6 × 0.7 | 1700 × 1 × 50 | 1.4 | <0.1 | 205 | 6.6 | Exist | 280 |
| 7B | 80 | Y₂O₃ | 3 | 3 | 2 | 10 | TiO₂<br>Mo₂C | 2<br>5 | 1 | 1800 × 6 × 0.7 | 1700 × 1 × 50 | 1.9 | <0.1 | 150 | 5.7 | None | 300 |
| 8B | 83 | Y₂O₃ | 3 | 5 | 2 | 5 | TiO₂<br>Mo₂C | 2<br>5 | 1 | 1800 × 6 × 0.7 | 1700 × 1 × 50 | 1.8 | <0.1 | 165 | 5.8 | Exist | 260 |
| 9B | 83 | Y₂O₃ | 3 | 3 | 4 | 5 | TiO₂<br>Mo₂C | 2<br>5 | 1 | 1800 × 6 × 0.7 | 1700 × 1 × 50 | 1.7 | <0.1 | 170 | 5.8 | Exist | 270 |
| 10B | 83 | Y₂O₃ | 3 | 3 | 2 | 5 | TiO₂ | 2 | 5 | 1800 × 6 × 0.7 | 1700 × 1 × 100 | 1.6 | <0.1 | 175 | 6.2 | Exist | 275 |

As is evident from the results shown in Table 4, the rolling balls according to the present Examples, which were manufactured by sintering a raw material compact containing a predetermined amount of a rare earth element and specified amounts of various additives, such as $Al_2O_3$, AlN, and SiC, and if necessary subjecting the sintered compact to HIP treatment, had no or few pores and exhibited no variation in the distribution of components in a grain boundary phase, high crushing strengths, and the rolling fatigue lives of more than 400 hours. Thus, the silicon nitride rolling balls according to the present Examples had great durability.

On the other hand, as shown in Comparative Examples 5B to 10B, where the sintered compacts contained various additives, including a rare earth component, in amounts outside the specified range of the present invention, even when sufficient sintering or HIP treatment was performed, it was confirmed that the sintered compacts exhibited poor workability, large variations in the distribution of components in a grain boundary phase, and short rolling fatigue lives.

The following Examples and Comparative Examples specifically describe the applications of abrasion resistant members to bearing rolling balls prepared from silicon nitride raw material powders containing different amounts of Fe and Ca as impurities.

Examples 22B to 76B and Comparative Examples 11B to 21B

Various powdered compounds, including oxide powder such as $Y_2O_3$ powder, nitride powder, and carbide powder used in Examples 3 to 21 were compounded so as to provide the compositions illustrated in Tables 5 to 7 thereby to prepare raw material mixtures. The raw material mixtures were charged into a molding die and were pressed into spherical compact precursors. The compact precursors were subjected to CIP treatment at a molding pressure of 150 MPa to prepare spherical compacts having a diameter of 11 mm serving as test samples for measuring the crushing strength and the rolling life.

The spherical compacts were degreased under the same conditions as in Example 1, and were sintered and were subjected to HIP treatment under the conditions illustrated in Tables 5 to 7. The resulting sintered compacts were ground into bearing rolling balls as abrasion resistant members according to Examples 22B and 76B and Comparative Examples 11B to 21B. The bearing rolling balls had a diameter of 9.52 mm and a surface roughness of 0.01 μm Ra. The surface roughness was expressed as a center-line average roughness (Ra) along the equator of a rolling ball measured with a stylus profilometer.

The rolling balls thus prepared as the abrasion resistant members according to the present Examples and Comparative Examples were evaluated for the workability, which was determined by the reduction rate of the diameter per unit time when the sintered bodies were ground into the balls, as well as the porosity, the crushing strength, the fracture toughness, variations in the distribution of components in a grain boundary phase, and the rolling fatigue life. The rolling fatigue life was measured as the same manner as in Example 1B. Tables 5 to 7 show the results of the measurements.

TABLE 5

| Sample | | Material Composition (wt. %) | | | | | | | | Sintering Conditions Temp. × Time × Pressure (°C.) × (hr) × (MPa) | HIP Conditions Temp. × Time × Pressure (°C.) × (hr) × (MPa) | Workability (Reduction Rate of Diameter per ) | Porosity (%) | Crushing Strength (MPa) | Fracture Toughness (MPa · m 1/2) | Variation in Component Distribution in Grain Boundary Phase | Rolling Life of Ball (Hr) |
|---|---|---|---|---|---|---|---|---|---|---|---|---|---|---|---|---|---|
| Example 22B | 90 | 2800 ppm | 700 ppm | Y$_2$O$_3$ | 2 | 2 | 2 | TiO$_2$ | 2 | 1800 × 6 × 0.7 | 1700 × 1 × 100 | 2 | <0.1 | 155 | 5.9 | None | >400 |
| 23B | 90 | 3200 ppm | 700 | Y$_2$O$_3$ | 2 | 2 | 2 | Mo$_2$C | 2 | 1800 × 6 × 0.7 | 1700 × 1 × 100 | 2 | <0.1 | 155 | 5.9 | None | 320 |
| 24B | 90 | 2800 | 1200 | Y$_2$O$_3$ | 2 | 2 | 2 | TiO$_2$ | 2 | 1800 × 6 × 0.7 | 1700 × 1 × 100 | 2 | <0.1 | 155 | 5.9 | None | 300 |
| 25B | 88 | 2800 | 700 | Y$_2$O$_3$ | 3 | 2 | 3 | TiO$_2$ | 3 | 1775 × 6 × 0.7 | — | 1.9 | 0.4 | 155 | 6.3 | None | >400 |
| 26B | 88 | 2800 | 700 | Y$_2$O$_3$ | 3 | 2 | 3 | Mo$_2$C | 3 | 1775 × 6 × 0.7 | 1700 × 1 × 100 | 1.7 | <0.1 | 170 | 6.3 | None | >400 |
| 27B | 88 | 3200 | 700 | Y$_2$O$_3$ | 3 | 2 | 3 | TiO$_2$ | 3 | 1775 × 6 × 0.7 | — | 1.9 | 0.4 | 155 | 6.3 | None | 365 |
| 28B | 88 | 3200 | 700 | Y$_2$O$_3$ | 3 | 2 | 3 | Mo$_2$C | 3 | 1775 × 6 × 0.7 | 1700 × 1 × 100 | 1.7 | <0.1 | 170 | 6.3 | None | 365 |
| 29B | 88 | 2800 | 1200 | Y$_2$O$_3$ | 3 | 2 | 3 | TiO$_2$ | 3 | 1775 × 6 × 0.7 | — | 1.9 | 0.4 | 155 | 6.3 | None | 330 |
| 30B | 88 | 2800 | 1200 | Y$_2$O$_3$ | 3 | 2 | 3 | Mo$_2$C | 3 | 1775 × 6 × 0.7 | 1700 × 1 × 100 | 1.7 | <0.1 | 170 | 6.3 | None | 340 |
| 31B | 86 | 2800 | 700 | Y$_2$O$_3$ | 3 | 2 | 5 | TiO$_2$ | 5 | 1800 × 6 × 0.7 | 1700 × 1 × 100 | 1.9 | <0.1 | 155 | 6.3 | None | 350 |
| 32B | 86 | 2800 | 700 | Y$_2$O$_3$ | 3 | 2 | 5 | Mo$_2$C | 5 | 1800 × 6 × 0.7 | 1700 × 1 × 100 | 1.7 | 0.6 | 155 | 6.1 | None | >400 |
| 33B | 86 | 3200 | 700 | Y$_2$O$_3$ | 3 | 2 | 5 | TiO$_2$ | 5 | 1800 × 6 × 0.7 | 1700 × 1 × 100 | 1.9 | <0.1 | 170 | 6.2 | None | >400 |
| 34B | 86 | 3200 | 700 | Y$_2$O$_3$ | 3 | 2 | 5 | Mo$_2$C | 5 | 1800 × 6 × 0.7 | — | 1.9 | 0.6 | 155 | 6.1 | None | 330 |
| 35B | 86 | 2800 | 1200 | Y$_2$O$_3$ | 3 | 2 | 5 | TiO$_2$ | 5 | 1800 × 6 × 0.7 | 1700 × 1 × 100 | 1.7 | <0.1 | 170 | 6.2 | None | 350 |
| 36B | 86 | 2800 | 1200 | Y$_2$O$_3$ | 3 | 2 | 5 | Mo$_2$C | 5 | 1800 × 6 × 0.7 | 1600 × 1 × 100 | 1.7 | <0.1 | 170 | 6.2 | None | 360 |
| 37B | 85 | 2800 | 700 | Y$_2$O$_3$ | 4 | 2 | 5 | TiO$_2$ | 5 | 1750 × 6 × 0.7 | 1600 × 1 × 100 | 1.6 | <0.1 | 190 | 6.3 | None | 370 |
| 38B | 85 | 2800 | 700 | Y$_2$O$_3$ | 4 | 2 | 5 | Mo$_2$C | 5 | 1750 × 6 × 0.7 | 1600 × 1 × 100 | 1.6 | <0.1 | 190 | 6.3 | None | >400 |
| 39B | 85 | 3200 | 1200 | Y$_2$O$_3$ | 4 | 2 | 5 | TiO$_2$ | 5 | 1750 × 6 × 0.7 | 1600 × 1 × 100 | 1.6 | <0.1 | 190 | 6.3 | None | 380 |
| 40B | 83 | 2800 | 700 | Y$_2$O$_3$ | 4 | 2 | 7 | TiO$_2$ | 7 | 1750 × 6 × 0.7 | 1700 × 1 × 100 | 1.7 | <0.1 | 175 | 6.0 | None | 365 |
| 41B | 83 | 3200 | 700 | Y$_2$O$_3$ | 4 | 2 | 7 | TiO$_2$ | 7 | 1750 × 6 × 0.7 | 1700 × 1 × 100 | 1.7 | <0.1 | 175 | 6.0 | None | >400 |
| 42B | 83 | 2800 | 1200 | Y$_2$O$_3$ | 4 | 2 | 7 | TiO$_2$ | 7 | 1750 × 6 × 0.7 | 1700 × 1 × 100 | 1.7 | <0.1 | 175 | 6.0 | None | 345 |
| 43B | 86 | 2800 | 700 | Y$_2$O$_3$ | 3 | 2 | 5 | Mo$_2$C | 5 | 1800 × 6 × 0.7 | 1700 × 1 × 100 | 1.6 | <0.1 | 185 | 6.3 | None | 330 |
| 44B | 86 | 3200 | 700 | Y$_2$O$_3$ | 3 | 2 | 5 | TiO$_2$ | 5 | 1800 × 6 × 0.7 | 1700 × 1 × 100 | 1.6 | <0.1 | 185 | 6.3 | None | >400 |
| 45B | 86 | 2800 | 1200 | Y$_2$O$_3$ | 3 | 2 | 5 | Mo$_2$C | 5 | 1800 × 6 × 0.7 | 1700 × 1 × 100 | 1.6 | <0.1 | 185 | 6.3 | None | 355 |
| 46B | 86 | 2800 | 700 | Y$_2$O$_3$ | 4 | 1 | 3 | TiO$_2$ | 3 | 1800 × 6 × 0.7 | 1700 × 1 × 50 | 1.7 | <0.1 | 180 | 6.3 | None | 350 |
| 47B | 86 | 3200 | 700 | Y$_2$O$_3$ | 4 | 1 | 3 | Mo$_2$C | 3 | 1800 × 6 × 0.7 | 1700 × 1 × 50 | 1.7 | <0.1 | 180 | 6.3 | None | 340 |
| 48B | 86 | 2800 | 1200 | Y$_2$O$_3$ | 4 | 1 | 3 | TiO$_2$ | 3 | 1800 × 6 × 0.7 | 1700 × 1 × 50 | 1.7 | <0.1 | 180 | 6.3 | None | 340 |
| 49B | 85 | 2800 | 700 | Y$_2$O$_3$ | 3 | 2 | 5 | Mo$_2$C | 5 | 1800 × 6 × 0.7 | 1700 × 1 × 100 | 1.7 | <0.1 | 175 | 6.2 | None | >400 |
| 50B | 85 | 2800 | 700 | Er$_2$O$_3$ | 4 | 3 | 5 | TiO$_2$ | 5 | 1750 × 6 × 0.7 | 1700 × 1 × 100 | 1.7 | <0.1 | 175 | 6.3 | None | >400 |

TABLE 6

| Sample | Material Composition (wt. %) | | | | | | | | Sintering Conditions Temp. × Time × Pressure (° C.) × (hr) × (MPa) | HIP Conditions Temp. × Time × Pressure (° C.) × (hr) × (MPa) | Workability (Reduction Rate of Diameter per Time) | Porosity (%) | Crushing Strength (MPa) | Fracture Toughness (MPa · m 1/2) | Variation in Component Distribution in Grain Boundary | Rolling Life of Ball (Hr) |
|---|---|---|---|---|---|---|---|---|---|---|---|---|---|---|---|---|
| Example 51B | 85 | 3200 ppm | 700 ppm | Er$_2$O$_3$ | 4 | 3 | 2 | 5 | TiO$_2$ | 1 | 1750 × 6 × 0.7 | 1700 × 1 × 100 | 1.7 | <0.1 | 175 | 6.3 | None | 350 |
| 52B | 85 | 2800 | 1200 | Y$_2$O$_3$ | 4 | 3 | 2 | 5 | TiO$_2$ | 1 | 1800 × 6 × 0.7 | 1700 × 1 × 100 | 1.7 | <0.1 | 175 | 6.3 | None | 340 |
| 53B | 85 | 3200 | 700 | Y$_2$O$_3$ | 3 | 3 | 2 | 5 | TiO$_2$ | 3 | 1800 × 6 × 0.7 | 1700 × 1 × 100 | 1.6 | <0.1 | 180 | 6.4 | None | >400 |
| 54B | 84 | 3200 | 700 | Y$_2$O$_3$ | 3 | 3 | 2 | 5 | TiO$_2$ | 3 | 1800 × 6 × 0.7 | 1700 × 1 × 100 | 1.6 | <0.1 | 180 | 6.4 | None | 370 |
| 55B | 84 | 2800 | 1200 | Y$_2$O$_3$ | 3 | 3 | 2 | 5 | TiO$_2$ | 3 | 1800 × 6 × 0.7 | 1700 × 1 × 100 | 1.6 | <0.1 | 180 | 6.4 | None | 350 |
| 56B | 85 | 2800 | 700 | Y$_2$O$_3$ | 3 | 3 | 2 | 5 | TiO$_2$ | 3 | 1800 × 6 × 0.7 | 1700 × 1 × 100 | 1.6 | <0.1 | 175 | 6.4 | None | >400 |
| 57B | 85 | 3200 | 700 | Y$_2$O$_3$ | 3 | 3 | 2 | 5 | HfO$_2$ | 2 | 1800 × 6 × 0.7 | 1700 × 1 × 100 | 1.7 | <0.1 | 175 | 6.4 | None | 380 |
| 58B | 85 | 2800 | 1200 | Y$_2$O$_3$ | 3 | 3 | 2 | 5 | HfO$_2$ | 2 | 1800 × 6 × 0.7 | 1700 × 1 × 100 | 1.7 | <0.1 | 180 | 6.4 | None | 370 |
| 59B | 85 | 2800 | 700 | Y$_2$O$_3$ | 3 | 3 | 2 | 5 | HfO$_2$ | 2 | 1800 × 6 × 0.7 | 1700 × 1 × 100 | 1.7 | <0.1 | 180 | 6.3 | None | >400 |
| 60B | 85 | 3200 | 700 | Y$_2$O$_3$ | 3 | 3 | 2 | 5 | ZrO$_2$ | 2 | 1800 × 6 × 0.7 | 1700 × 1 × 100 | 1.7 | <0.1 | 180 | 6.3 | None | 360 |
| 61B | 85 | 2800 | 1200 | Y$_2$O$_3$ | 3 | 3 | 2 | 5 | ZrO$_2$ | 2 | 1800 × 6 × 0.7 | 1700 × 1 × 100 | 1.7 | <0.1 | 180 | 6.3 | None | 340 |
| 62B | 86 | 2800 | 700 | Y$_2$O$_3$ | 3 | 3 | 2 | 5 | ZrO$_2$ | 2 | 1800 × 6 × 0.7 | 1700 × 1 × 100 | 1.6 | <0.1 | 170 | 6.3 | None | >400 |
| 63B | 86 | 3200 | 700 | Y$_2$O$_3$ | 3 | 3 | 2 | 5 | NbC | 1 | 1800 × 6 × 0.7 | 1700 × 1 × 100 | 1.6 | <0.1 | 170 | 6.3 | None | 350 |
| 64B | 86 | 2800 | 1200 | Y$_2$O$_3$ | 3 | 3 | 2 | 5 | NbC | 1 | 1800 × 6 × 0.7 | 1700 × 1 × 100 | 1.6 | <0.1 | 170 | 6.3 | None | 330 |
| 65B | 86 | 2800 | 700 | Y$_2$O$_3$ | 3 | 3 | 2 | 5 | NbC | 1 | 1800 × 6 × 0.7 | 1700 × 1 × 100 | 1.7 | <0.1 | 190 | 6.2 | None | >400 |
| 66B | 86 | 3200 | 700 | Y$_2$O$_3$ | 3 | 3 | 2 | 5 | WC | 1 | 1800 × 6 × 0.7 | 1700 × 1 × 100 | 1.7 | <0.1 | 190 | 6.2 | None | 360 |
| 67B | 86 | 2800 | 1200 | Y$_2$O$_3$ | 3 | 3 | 2 | 5 | WC | 1 | 1800 × 6 × 0.7 | 1700 × 1 × 100 | 1.7 | <0.1 | 190 | 6.2 | None | 350 |
| 68B | 85 | 2800 | 700 | Y$_2$O$_3$ | 3 | 3 | 2 | 5 | WC | 1 | 1800 × 6 × 0.7 | 1700 × 1 × 100 | 1.5 | <0.1 | 170 | 6.3 | None | >400 |
| 69B | 85 | 3200 | 700 | Y$_2$O$_3$ | 3 | 3 | 2 | 5 | TaC | 2 | 1800 × 6 × 0.7 | 1700 × 1 × 100 | 1.5 | <0.1 | 170 | 6.3 | None | 350 |
| 70B | 85 | 2800 | 1200 | Y$_2$O$_3$ | 3 | 3 | 2 | 5 | TaC | 2 | 1800 × 6 × 0.7 | 1700 × 1 × 100 | 1.5 | <0.1 | 170 | 6.3 | None | 330 |
| 71B | 86 | 2800 | 700 | Y$_2$O$_3$ | 3 | 3 | 2 | 5 | TaC | 2 | 1800 × 6 × 0.7 | 1700 × 1 × 100 | 1.6 | <0.1 | 165 | 6.3 | None | >400 |
| 72B | 86 | 3200 | 700 | Y$_2$O$_3$ | 3 | 3 | 2 | 5 | Cr$_2$O$_3$ | 1 | 1800 × 6 × 0.7 | 1700 × 1 × 100 | 1.6 | <0.1 | 165 | 6.3 | None | 330 |
| 73B | 86 | 2800 | 1200 | Y$_2$O$_3$ | 3 | 3 | 2 | 5 | Cr$_2$O$_3$ | 1 | 1800 × 6 × 0.7 | 1700 × 1 × 100 | 1.6 | <0.1 | 165 | 6.3 | None | 310 |
| 74B | 87 | 2800 | 700 | Y$_2$O$_3$ | 3 | 3 | 2 | 5 | — | — | 1800 × 6 × 0.7 | 1700 × 1 × 100 | 1.8 | <0.1 | 165 | 6.3 | None | >400 |
| 75B | 87 | 3200 | 700 | Y$_2$O$_3$ | 3 | 3 | 2 | 5 | — | — | 1800 × 6 × 0.7 | 1700 × 1 × 100 | 1.8 | <0.1 | 165 | 6.3 | None | 340 |
| 76B | 87 | 2800 | 1200 | Y$_2$O$_3$ | 3 | 3 | 2 | 5 | — | — | 1800 × 6 × 0.7 | 1700 × 1 × 100 | 1.8 | <0.1 | 165 | 6.3 | None | 330 |

TABLE 7

| Sample | | Material Composition (wt. %) | | | | | | | | | | Sintering Conditions Temp. × Time × Pressure (°C.) × (hr) × (MPa) | HIP Conditions Temp. × Time × Pressure (°C.) × (hr) × (MPa) | Workability (Reduction Rate of Diameter per Time) | Porosity (%) | Crushing Strength (MPa) | Fracture Toughness (MPa · m 1/2) | Variation in Component Distribution in Grain Boundary Phase | Rolling Life of Ball (Hr) |
|---|---|---|---|---|---|---|---|---|---|---|---|---|---|---|---|---|---|---|---|
| Comparative Example | 11B | 83 | 2800 ppm | 700 ppm | Y₂O₃ | 5 | 3 | 2 | TiO₂ | 5 | Mo₂C | 1 | 1750 × 6 × 0.7 | 1700 × 1 × 50 | 1.4 | <0.1 | 200 | 6.4 | Exist | 280 |
| | 12B | 83 | 130 | 60 | Y₂O₃ | 5 | 3 | 2 | TiO₂ | 5 | Mo₂C | 1 | 1750 × 6 × 0.7 | 1700 × 1 × 50 | 1.4 | <0.1 | 200 | 6.4 | Exist | >400 |
| | 13B | 81 | 2800 | 700 | Y₂O₃ | 7 | 3 | 2 | TiO₂ | 5 | Mo₂C | 1 | 1750 × 6 × 0.7 | 1700 × 1 × 50 | 1.4 | <0.1 | 205 | 6.6 | Exist | 280 |
| | 14B | 81 | 130 | 60 | Y₂O₃ | 7 | 3 | 2 | TiO₂ | 5 | Mo₂C | 1 | 1750 × 6 × 0.7 | 1700 × 1 × 50 | 1.4 | <0.1 | 205 | 6.6 | Exist | >400 |
| | 15B | 80 | 2800 | 700 | Y₂O₃ | 3 | 3 | 2 | TiO₂ | 5 | Mo₂C | 1 | 1800 × 6 × 0.7 | 1700 × 1 × 50 | 1.9 | <0.1 | 150 | 5.7 | None | 300 |
| | 16B | 80 | 130 | 60 | Y₂O₃ | 3 | 3 | 2 | TiO₂ | 5 | Mo₂C | 1 | 1800 × 6 × 0.7 | 1700 × 1 × 50 | 1.9 | <0.1 | 150 | 5.7 | None | >400 |
| | 17B | 83 | 2800 | 700 | Y₂O₃ | 3 | 5 | 2 | TiO₂ | 5 | Mo₂C | 1 | 1800 × 6 × 0.7 | 1700 × 1 × 50 | 1.8 | <0.1 | 165 | 5.8 | Exist | 260 |
| | 18B | 83 | 130 | 60 | Y₂O₃ | 3 | 5 | 2 | TiO₂ | 5 | Mo₂C | 1 | 1800 × 6 × 0.7 | 1700 × 1 × 50 | 1.8 | <0.1 | 165 | 5.8 | Exist | >400 |
| | 19B | 83 | 2800 | 700 | Y₂O₃ | 3 | 3 | 4 | TiO₂ | 5 | Mo₂C | 1 | 1800 × 6 × 0.7 | 1700 × 1 × 50 | 1.7 | <0.1 | 170 | 5.8 | Exist | 270 |
| | 20B | 83 | 130 | 60 | Y₂O₃ | 3 | 3 | 4 | TiO₂ | 5 | Mo₂C | 1 | 1800 × 6 × 0.7 | 1700 × 1 × 50 | 1.7 | <0.1 | 170 | 5.8 | Exist | >400 |
| | 21B | 83 | 2800 | 700 | Y₂O₃ | 3 | 3 | 2 | TiO₂ | 5 | | | 1800 × 6 × 0.7 | 1700 × 1 × 100 | 1.6 | <0.1 | 175 | 6.2 | Exist | 275 |

As is evident from the results shown in Tables 5 to 7, when the Fe contents or the Ca contents of the sintered silicon nitrides were out of the ranges of 10 to 3000 ppm and 10 to 1000 ppm, respectively, it was confirmed that the rolling lives of the balls tended to decrease.

On the other hand, according to the present Comparative Examples, even when the contents of Fe and Ca impurities were controlled within the desirable ranges of the present invention, the raw material composition, the sintering conditions, and the HIP conditions had large effects on the strength characteristics and the uniformity of the sintered body structures, so that it was confirmed that the variations in the rolling lives of the balls might be large.

INDUSTRIAL APPLICABILITY

As described above, according to an abrasion resistant member of the present invention and a method for manufacturing the same, predetermined amounts of a rare earth element, aluminum component such as $Al_2O_3$, silicon carbide, and optional compounds such as Ti, Hf, or Zr are added to an inexpensive silicon nitride raw powder synthesized by metal nitriding method, thereby to prepare a raw material mixture. Thus, the present invention can provide an inexpensive silicon nitride abrasion resistant member that has significantly improved sintering characteristics and workability, and a high density and a high mechanical strength, equal to or higher than those of conventional sintered silicon nitride, as well as high abrasion resistance and in particular a long rolling life, and is suitable for a rolling bearing member.

Furthermore, the formation of pores is prevented or reduced, and variations in the distribution of components in a grain boundary phase are eliminated. Thus, the resulting abrasion resistant member has a long rolling life and great durability. A bearing prepared using the abrasion resistant member as a rolling bearing member can retain excellent rolling characteristics for a long period of time. Thus, a rotary apparatus having high operational reliability and great durability can be provided.

The invention claimed is:

1. A silicon nitride abrasion resistant member formed of a silicon nitride sintered body comprising 2% to 4% by mass of a rare earth element in terms of oxide as a sintering aid, 2% to 6% by mass of an Al component in terms of oxide, 2% to 7% by mass of silicon carbide, 10 to 3000 ppm of Fe, and from 10 to 1000 ppm of Ca, wherein said silicon nitride sintered body has a porosity of 1% or less, a three-point bending strength of 800 to 1000 MPa, and a fracture toughness of 5.7 to 6.5 MPa·m$^{1/2}$, and silicon nitride sintered body is subjected to a grinding work.

2. The silicon nitride abrasion resistant member according to claim 1, wherein said silicon nitride sintered body contains 3% by mass or less of at least one element selected from the group consisting of Ti, Zr, Hf, W, Mo, Ta, Nb, and Cr in terms of oxide thereof.

3. The silicon nitride abrasion resistant member according to claim 1, wherein when three SUJ 2 rolling steel balls having a diameter of 9.35 mm (a) are placed on a track having a diameter of 40 mm disposed on the top surface of a plate abrasion resistant member formed of the sintered silicon nitride and (b) are rotated at 1200 rpm under a pressing load of 39.2 MPa, the rolling life, which is defined by the number of rotations that have been occurred by the time the silicon nitride abrasion resistant member is exfoliated, is at least $1\times10^7$.

4. The silicon nitride abrasion resistant member according to claim 1, wherein when the silicon nitride sintered body has a crushing strength of 150 to 200 MPa and a fracture toughness of 5.7 to 6.5 MPa·m$^{1/2}$ and when three rolling balls having a diameter of 9.35 mm prepared from an abrasion resistant member formed of the silicon nitride sintered body (a) are placed on a track having a diameter of 40 mm disposed on the top surface of an SUJ 2 steel plate and (b) are rotated at 1200 rpm under a maximum contact stress of 5.9 GPa, the rolling fatigue life, which is defined by the elapsed time until the rolling balls are exfoliated, is at least 400 hours.

5. The silicon nitride abrasion resistant member according to claim 1, wherein the silicon nitride abrasion resistant member is a bearing rolling ball.

6. The silicon nitride abrasion resistant member according to claim 1, wherein said Al component is alumina ($Al_2O_3$) or aluminum nitride (AlN).

* * * * *